(12) United States Patent
Pun (10) Patent No.: US 7,497,252 B2
(45) Date of Patent: Mar. 3, 2009

(54) ACTIVE FLUID AND AIR HEAT EXCHANGER AND METHOD

(76) Inventor: John Yenkai Pun, 92955 Hill Grade Dr., Coos Bay, OR (US) 97420

( * ) Notice: Subject to any disclaimer, the term of this patent is extended or adjusted under 35 U.S.C. 154(b) by 103 days.

(21) Appl. No.: 11/337,883

(22) Filed: Jan. 24, 2006

(65) Prior Publication Data

US 2008/0135224 A1 Jun. 12, 2008

(51) Int. Cl.
*F25B 29/00* (2006.01)

(52) U.S. Cl. .................................... 165/247

(58) Field of Classification Search ................ 165/133, 165/247, 287, 288; 62/121, 304, 305, 314, 62/315; 239/77
See application file for complete search history.

(56) References Cited

U.S. PATENT DOCUMENTS

| | | | |
|---|---|---|---|
| 4,609,145 A | 9/1986 | Miller | |
| 4,659,013 A | 4/1987 | Ledebuhr | |
| 4,995,454 A | 2/1991 | Thompson | |
| 5,168,722 A * | 12/1992 | Brock | 62/314 |
| 5,497,633 A * | 3/1996 | Jones et al. | 62/314 |
| 5,598,719 A * | 2/1997 | Jones et al. | 62/304 |
| 5,775,121 A * | 7/1998 | Kuma et al. | 62/121 |
| 6,035,927 A | 3/2000 | Krauss et al. | |
| 6,119,769 A | 9/2000 | Yu et al. | |
| 6,167,950 B1 | 1/2001 | Gupte et al. | |
| 6,173,763 B1 | 1/2001 | Sano et al. | |
| 6,178,766 B1 | 1/2001 | Tong et al. | |
| 6,182,743 B1 | 2/2001 | Bennett et al. | |
| 6,192,976 B1 | 2/2001 | Yoshida et al. | |
| 6,293,121 B1 * | 9/2001 | Labrador | 62/304 |
| 7,165,410 B2 * | 1/2007 | Carr et al. | 62/121 |

\* cited by examiner

*Primary Examiner*—Ljiljana (Lil) V Ciric
(74) *Attorney, Agent, or Firm*—Weaver Austin Villeneuve & Sampson LLP (57) ABSTRACT

A modular apparatus for active heat exchange involving continuous atomization of chilled or heated fluid droplets, droplets projection, and formation of fluid film on a large surface for reciprocal two way heat transfer with circulating air. A closed, pleated, corrugated, thin-wall, heat conductive chamber (1) provides the large surface for formation of fluid film and separation between fluid and air offering short and rapid heat conductive path between fluid and air. An axial blower (11) integrated with the heat exchanger module provides recirculation of air where the heat exchanger module (28) is situated. The modular heat exchanger (28) or multiple of which is integrated with other components such as a refrigeration unit (37), a heating element (25), and a central fluid reservoir (23) in which fluid is pre-chilled or preheated in the application of air conditioning and heating. The fluid is conveyed by small bore tubes to individual modules by a pump (26) then returns to the central reservoir (23) for re-chill or reheat in a close loop fluid flow configuration. A stepping motor (7c) controlled valve (7B) regulated amount of fluid is processed by the heat exchanger.

6 Claims, 10 Drawing Sheets

ACTIVE FLUID AND AIR HEAT EXCHANGER AND METHOD

BACKGROUND OF INVENTION

The present invention relates to an apparatus and method for atomization of chilled or heated fluid, projection of droplets, and formation of a fluid film in a chamber with large surface area for heat exchange in the application of refrigeration, air conditioning, and heating of room, space, structure or dwelling.

Heat exchanger technology has long existed. Prior art for heat exchanger in application of refrigeration, air conditioning, commonly referred to as evaporator involves rapid expansion of compressed liquid refrigerant converting to gas inside a small diameter metal tube fitted with heat conductive fins. Heat is absorbed while ambient air is blown over this assembly by use of a motorized blower. For heating, the air is commonly heated by flame or by an electrical resistive heater. In some cases hot fluid is circulated inside a similar device as the evaporator described. Various configurations of this basic heat exchanger are exemplified by U.S. Pat. Nos. 6,192,976; 6,035,927; 6,182,743; 6,178,766; 6,173,763, and 6,167,950. Disadvantages of this type of heat exchanger are many. Small diameter tubing, even long in length, does not possess large surface area for heat transfer. Narrow thin fins, approximately on the order of 2.5 to 5 centimeters (1 to 2 inches) in width and 0.25 millimeter (0.01 inch) in thickness as commonly used, attaching edgewise to the tubing, limit heat transfer capacity. Heat conduction must also travel a distance from the fins to reach the tubing. Air contact time with the evaporator heat exchanger assembly is necessarily brief due to the limited width of fins and high velocity of air travelling over the evaporator, contributing to low heat energy transfer. Air molecules in immediate direct contact with cold or hot surfaces only perform heat exchange. Air is a poor heat conductor; molecule vibration caused by heat is not easily transmitted to adjacent molecules due to large distances separating them. Such inefficiency leads to requirement of large capacity refrigeration and heating units to provide a large temperature differential between the evaporator and ambient air at a sacrifice of energy consumption.

Prior efforts to increase surface area for heat exchange, particularly, in the application of cooling fluid, between fluid and fluid employing small corrugated tubing, have been exemplified by U.S. Pat. Nos. 6,119,769 and 4,995,454. However, such modified configurations are far from adequate for efficient heat exchange between fluid and air in the application of air conditioning and heating.

In a central air conditioning and heating system for a structure or dwelling, a large centrifugal blower generating air flow with high static pressure is needed to propel air through the heat exchanger or evaporator and furnace into a system of large ducts for distribution into various rooms and spaces through open grills. It has been verified by scientific studies that energy loss for a ducting system is greater than 20 percent of the total consumed by a central air conditioning and heating system. This energy deficit is primarily caused by heat gained or lost while chilled or heated air travels through the ducts even insulated according to recommended common practice. Significant air velocity is also diminished due to resistance from friction while air is in contact with large duct wall surface and confronting turns of the ducts necessary for reaching final destinations. A large centrifugal blower for a central air conditioning and heating system for an average size dwelling consumes kilowatts of electric power per hour.

One disadvantage of the above described ducting system is the requirement of multiple size ducts to balance air flow and temperature in various locations in a structure or dwelling dependent upon sizes, lengths, shapes, and turns of ducts. Proper balance of temperatures in all locations within a structure or dwelling is seldom achievable with such a method.

Baffles or shutters, preset or motorized, have been placed inside air ducts in larger or commercial buildings to regulate amount of air flow into a room or area in an effort to provide acceptable air flow and temperature regulation in air conditioning. Such efforts are energy wasting and far from satisfactory in delivering the right amount of conditioned air.

Another disadvantage of the above-described ducting system is that temperature of specific room or space within a structure or dwelling cannot be individually or incrementally controlled in an easy manner. A grill with louver adjusting mechanism located in a room or space has to be manually moved; therefore fine adjustment of temperature is not possible.

Another prior art of heating a structure or dwelling involves heating a large amount of fluid, generally water, with a large capacity water heater and conveying the heated fluid to various locations of a structure through a system of pipes. Once reaching a particular location, the pipe is arranged in a back and forth fashion and mounted under the floor, above the ceiling, or behind a wall as a heat exchanger radiating heat into a room or space. Such a heating system is commonly termed a "hydronic" heating system. One disadvantage of such a heating system is that a separate system is required for cooling. Another disadvantage is that a large amount of fluid is needed to be continuously heated thus requiring a large capacity heater with attending large energy consumption. Generally, temperature control in various locations is not available or possible. Furthermore, the structural element in which the "heat exchanger" is enclosed must first be heated before heat can radiate into a room or space. Occupants within feel the increase in temperature with significant delay. A warm building also radiates heat to cold outside environment wasting energy.

In view of the foregoing, it would be desirable to provide a more efficient heat exchanger and its integration into a functional system for refrigeration or air conditioning and heating purposes without all the above mentioned deficiencies.

The present invention provides a modular apparatus that continuously atomizes a small quantity of chilled or heated fluid into a large number of small droplets and projects the droplets onto a large surface area to form a fluid film for heat transfer. Atomization and projection is accomplished by centrifugal force generated by a rapidly spinning slotted and screen cylinder. Rotating cylinders with perforations and cylindrical screens have been described in U.S. Pat. Nos. 4,609,145 and 4,659,013. These various modes of atomization, primarily provided for agricultural spraying, possess shortcomings that render them unsuitable for application in this invention. They suffer the inability to uniformly generate droplets along the entire cylinder length or sustain the cylindrical shape for uniform droplet atomization under high rotating speed or centrifugal force.

Earlier attempts in generating droplets along the long axis of a rotating device by centrifugal force are also exemplified in U.S. Pat. Nos. 1,022,956 and 3,168,596. Unfortunately these prior arts generate narrow bands of droplets with large separation between bands; therefore they are unsuitable in an application requiring uniform and even droplet distribution.

The surface on which the fluid film is formed is the inner surface of a closed pleated corrugated chamber composed of thin gage heat conductive material for promotion of rapid and efficient heat transfer. Ambient air, provided by a blower, circulating on the outside of this chamber, has long contact time with the chamber surface and large surface area for greater amount of heat energy transfer.

Heat exchanger modules of this invention are intended to be located in rooms or spaces where air conditioning or heating is needed. A central fluid reservoir is employed for chilling and heating fluid to be atomized by the heat exchanger. Small bore tubes are used to convey pre-chilled or preheated fluid to a heat exchanger and return for re-chill and reheat, eliminating the need for large air ducts as in conventional practice. Small tubes are also more economical as well as much easier to provide complete insulation to maintain the heat-energy-state of the fluid in transit. By providing a blower in the heat exchanger module at site where the module is installed has many advantages. One such advantage is the circulating air to be cooled or heated in the immediate vicinity of the module. There is no need for a large central blower that consumes a large amount of energy. The temperature in a given room or space can be cooled or heated quickly without the problem of heat conduction of air over a long distance in returning to the central blower to be cooled or reheated again. An added benefit of this invention is the ability to control temperature where it is needed and to what extent in individual room or space. The heat exchanger module or modules in area or areas without human occupation within a structure or dwelling can be shut off for further savings on energy use.

The present invention of heat exchange module is equipped with a motorized variable valve for changing the rate of fluid being processed. Since the large heat transfer surface is so efficient, an increase of fluid entering the exchanger increases the heat transfer rate as well. The heat exchange rate of any given moment can be calculated by input fluid temperature, rate of fluid being processed, and the outbound fluid temperature from an integrated exiting processed fluid temperature sensor. This arrangement provides the heat exchanger's unique ability to actively respond to changing heat leakage (heat load) from amount of heat transfer by increasing or decreasing fluid input to be processed by the heat exchanger. After noting the heat transfer amount information at any given moment we can program an increase heat transfer rate to utilize available evaporator cooling or heater's heating capacity optimally for purpose of energy savings. It should be noted that all traditional air conditioners are passive with heat exchange rates affected by environment conditions from moment to moment resulting in greater waste of energy. This invention is differentiated from tradition air conditioners by being able to actively change heat transfer rate based on information gleaned from temperature sensors and control of motorized variable fluid valve (fluid processed rate).

A small air conditioner of this invention with a single heat exchanger module operating with a thermostat control can be employed as an instrument to measure a room's heat leakage (heat load) which utilizes the major portion of an air conditioner's capacity to counter. By keeping a room's temperature constant, the heat absorption or distribution rate is essentially the heat leakage rate which has not been able to measure previously.

SUMMARY

The present invention relates to a modular apparatus and methods for active heat exchange involving fluid atomization, droplets projection, fluid film formation on a large surface for reciprocal two way heat transfer with air, and its integration with other elements into a refrigeration, or air conditioning and heating system.

More particularly, the present invention continuously circulates a small quantity of pre-chilled or preheated fluid through small tubes to self-contained active heat exchanger modules located in specific rooms or spaces where fluid and air heat transfer take place. More importantly, the processed fluid is returned for re-chilling or re-heating in a closed loop fluid flow circuit.

In one preferred embodiment, the present invention provides a self-contained heat exchange apparatus comprised of an electric motor, a stepping motor controlled variable fluid valve, a fluid delivery tube, a spinning slotted and screened cylinder, a pumping vane, a small enclosed chamber containing a temperature sensor for measuring returning outbound fluid, an electric blower, a closed heat conductive chamber, and a housing shell in a modular configuration.

An aspect of the invention is the utilization of a motorized variable fluid valve to change amount of fluid being processed by the heat exchanger based on input and outbound temperature information plus previous instant of input fluid rate denoting heat transfer rate.

In another preferred embodiment, the present invention provides a functional air conditioning and heating system with a single heat exchanger or multiple modules comprised of a central fluid reservoir containing the evaporator of a refrigeration unit and a submersible electric resistive heater, a refrigeration unit (a compressor and condenser), an electric pump, a central fluid dispenser, insulted small tubes, and appropriate electronic temperature sensors and controls.

One important aspect is to employ fluid as a medium for heat exchange instead of air as in common practice. A small quantity of fluid is atomized into an extremely large number of small droplets, and a large number of droplets are spread over a very large area forming a fluid film. A large area for heat transfer results in ample amount of heat energy being transferred between fluid and air, achieving high efficiency. Another object of this invention is to minimize heat energy conduction time between fluid and air across the heat conductive barrier for rapid heat transfer. Use of thin gage heat conductive material forming the wall of the closed chamber, separating the fluid film and circulating air, provides heat energy transfer efficiency in quantity as well as rapidity. Ability to effect a large amount of heat transfer also renders possible this invention to be active in changing heat transfer rate. An important object is to maintain heat-energy-state of the chilled or heated fluid during transit to individual heat exchangers. This is made possible by transporting only a small quantity of fluid with well-insulated small tubing for circulation in the closed fluid loop. This arrangement makes possible the elimination of energy-wasting large air ducts traditionally used for heat energy transport in similar applications.

Another important aspect of this invention is that the rate of fluid turnover during heat transfer for each heat exchanger is so low, a much smaller and lower capacity refrigeration and heating unit are employed in a functional system compared to conventional air conditioning and heating systems. This aspect makes possible large initial and continuing economical and energy savings.

Other objects, features and advantages of the present invention will become apparent from the following description when taken in conjunction with the accompanying drawings.

BRIEF DESCRIPTION OF THE DRAWINGS

The accompany drawings, which are incorporated and form a part of this specification, illustrate embodiments of the invention and together with the descriptions, serve to explain the principles of the invention.

REFERENCE NUMERALS IN DRAWINGS 1 closed, thin wall, heat conductive, corrugated, and pleated chamber
2 slotted and screened cylinder
3 open slot
3a fine mesh screen
4 perforated tube for fluid delivery
4b elastic tubing
4c clamp
4d fluid delivery tube perforation
4e slit on elastic tubing
4f fluid delivery tube stopper
4g spray pattern through slit of elastic tubing
5 electric motor
5a mount for chamber assembly to heat exchanger shell cover
6 outer shell cover of heat exchanger
7 fluid inlet tube for pre-chilled or preheated fluid
7a small tube carrying fluid from central reservoir to heat exchanger
8 outlet tube for processed fluid
8a small tube returning fluid from heat exchanger to reservoir
9 drain opening into reservoir
10 heat exchanger reservoir
11 electric blower
12 struts for mounting heat exchanger chamber to outer shell cover
13 Peltier device heat exchanger outlet to heat exchanger
14 Peltier device heat exchanger inlet from heat exchanger
15 Peltier device heat exchanger cover
16 Peltier device heat exchanger body
17 channel or trough of Peltier device heat exchanger
18 electronic Peltier device
19 heat absorber or dissipater body
20 heat absorber or dissipater cover
21 heat absorber or dissipater outlet
22 heat absorber or dissipater inlet
23 central reservoir with refrigeration evaporator tube and immersion heater
24 refrigeration evaporator tube fin
24a evaporator tube of refrigeration unit
25 electric immersion heater
26 fluid delivery pump
27 electronic controlled valve
28 active fluid and air heat exchanger module
29 Peltier heat exchanger assembly
30 Peltier device heat absorber or heat dissipater heat exchanger (fluid and air)
31 blower for 30
32 fluid reservoir associated with Peltier device heat absorber or heat dissipater heat exchanger
33 electric pump returning fluid to Peltier device heat exchanger assembly
34 optional exterior pump for circulating fluid between Peltier device heat exchanger assembly and active fluid and air heat exchanger
36 reservoir for independently functioning air conditioner and heater
37 refrigeration unit
38 pump for active fluid and air heat exchanger if no internal pump
39 connecting rod between slotted cylinder and pumping vane
40 pumping vane
41 motor driving pumping vane
42 one piece solid fin
43 corrugated or pleated chamber in shape of an air bellow
44 centrifugal blower

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

As described above, the present invention provides an apparatus and method for fluid and air heat exchange in the application of refrigeration, air conditioning, and heating of rooms, spaces, structures or dwellings. More particularly, the apparatus atomizes pre-chilled or preheated fluid from a central reservoir into small uniform sized droplets, projects the droplets by centrifugal force onto the inner surface of a closed, thin-wall, heat conductive chamber and forms a continuous fluid film on the chamber wall. Heat energy of ambient air circulating outside the chamber is absorbed through the chamber wall and transferred to the fluid film inside the chamber in the process of heat exchange during refrigeration or air conditioning. Heat energy is conducted through the chamber wall from the fluid film and transferred to the ambient air in the process of heat exchange for heating. The fluid film is continuously being supplied with newly arriving droplets, and excess fluid from the fluid film is collected and continuously returned to the central reservoir to be re-chilled or reheated, providing a closed loop fluid flow system.

In one preferred embodiment, the present invention provides a modular fluid and air heat exchanger comprised of a electronically controlled stepping motor driven fluid valve, a perforated tube for delivery of fluid, a motorized spinning slotted screened cylinder, a closed thin wall, heat conductive pleated and corrugated chamber, an integrated pumping element, a small chamber containing a sensor measuring exit fluid temperature, an axial blower, and an outer enclosure. These components interact to perform the functions of delivery of fluid to be atomized, atomization of fluid into droplets, projection of droplets, formation of a fluid film, pumping of processed fluid for re-chill or reheat, and circulating air within the module for fluid and air heat exchange. Temperature and humidity sensors and associated electronic controls enable the temperature of the room where the heat exchanger is situated, to be set and controlled by direct or remote control individually. Other components that are needed for the module to function as an independent air conditioning and heating device include a refrigeration unit. a heating element, a fluid reservoir with the evaporator of the refrigeration unit and the heating element immersed in the fluid, an electric pump, and small tubes for delivery and return of fluid to and from the module. These components interact to perform the function of fluid to air heat exchange in an independently functioning device for air conditioning and heating for a room or space within a structure or dwelling. In another aspect of the invention, multiple modules are integrated with other components to form a complete air conditioning and heating system for a structure or dwelling. These other components are comprised of a refrigeration unit, a heating element, a central fluid reservoir with refrigeration evaporator and heating element immersed, an electric pump for fluid delivery, a central fluid dispenser, and multiple small tubes for delivery and return of fluid from and to the central reservoir.

An important aspect of this invention is the use of fluid instead of air for conveying heat energy to be absorbed or dispensed due to fluid's significantly higher heat energy absorption and retention capacity than air of equal volume. Another important aspect of this invention is that the fluid processing rate per fluid and air heat exchanger in atomization is exceedingly low, on the order of less than 200 milliliter per minute for a 22.86 centimeter (9 inch) diameter heat exchanger suitable for central air conditioning and heating purpose. Another aspect of the invention is that low fluid turnover rate for re-chill or reheat requires small bore tubes on the order of 6.35 millimeter (0.25 inch) diameter for fluid conveyance between central reservoir and individual heat exchange modules. There are two importance consequences as a result of this invention. One aspect is the elimination of the need for large air ducts for heat conveyance used in conventional central air conditioning and heating systems with resulting higher efficiency and low initial costs. Another aspect is the small amount of fluid required on the order of 1.6 liter from 8 modules for continuous re-chilling and rehearing in an average size dwelling of 833 square meters (2,500 square feet), leading to requirements of much smaller capacity refrigeration and heating unit compared to conventional systems. These two aspects result in significant power savings. Another aspect of this invention is that each heat exchange module can be independently regulated for raising or lowering the ambient temperature of environment in which it is situated within a structure or dwelling, adding to occupants' choice of desirable temperature comfort level. Modules in areas without human occupation can be independently shut off by electrically operated valves and switches without affecting other modules in operation, leading to further power savings.

Figure 1:
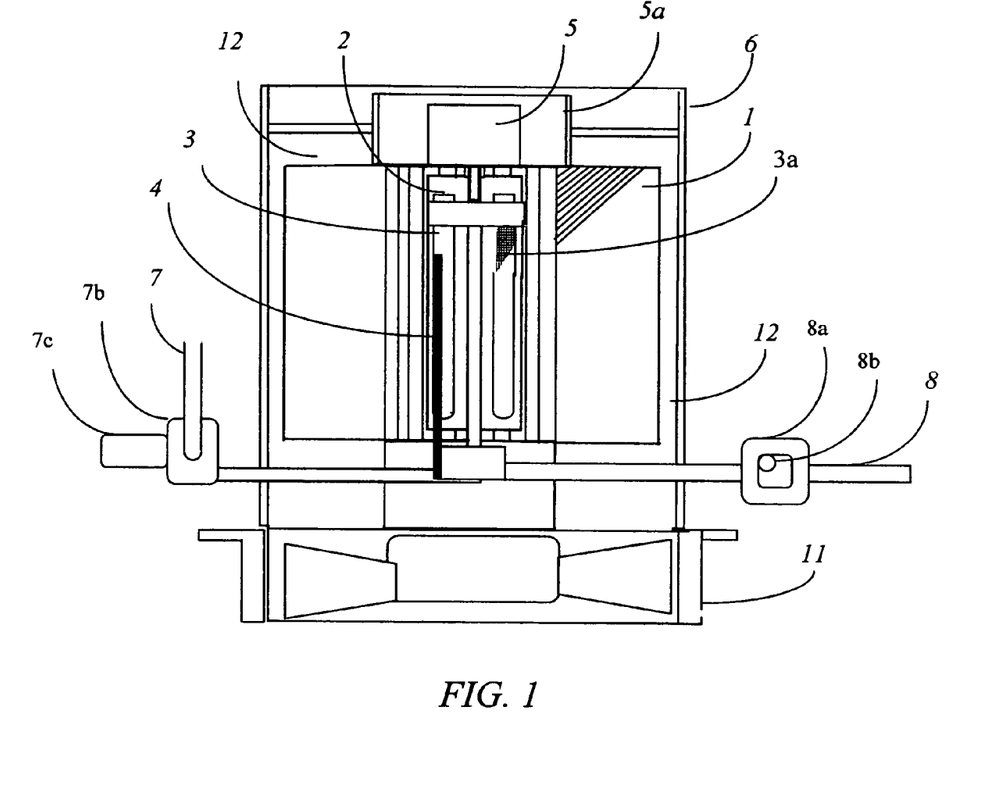
FIG. 1 is a full cross section elevation view of the fluid and air heat exchanger module in accordance with the present invention, indicating the spatial relationship of components such as fluid delivery tube, stepping motor controlled variable fluid valve, small fluid chamber containing sensor measuring temperature of process fluid, spinning slotted and screened cylinder, electric motor driving the spinning slotted cylinder, closed thin wall heat conductive pleated and corrugated chamber, blower, and housing shell.
Figure 1A:
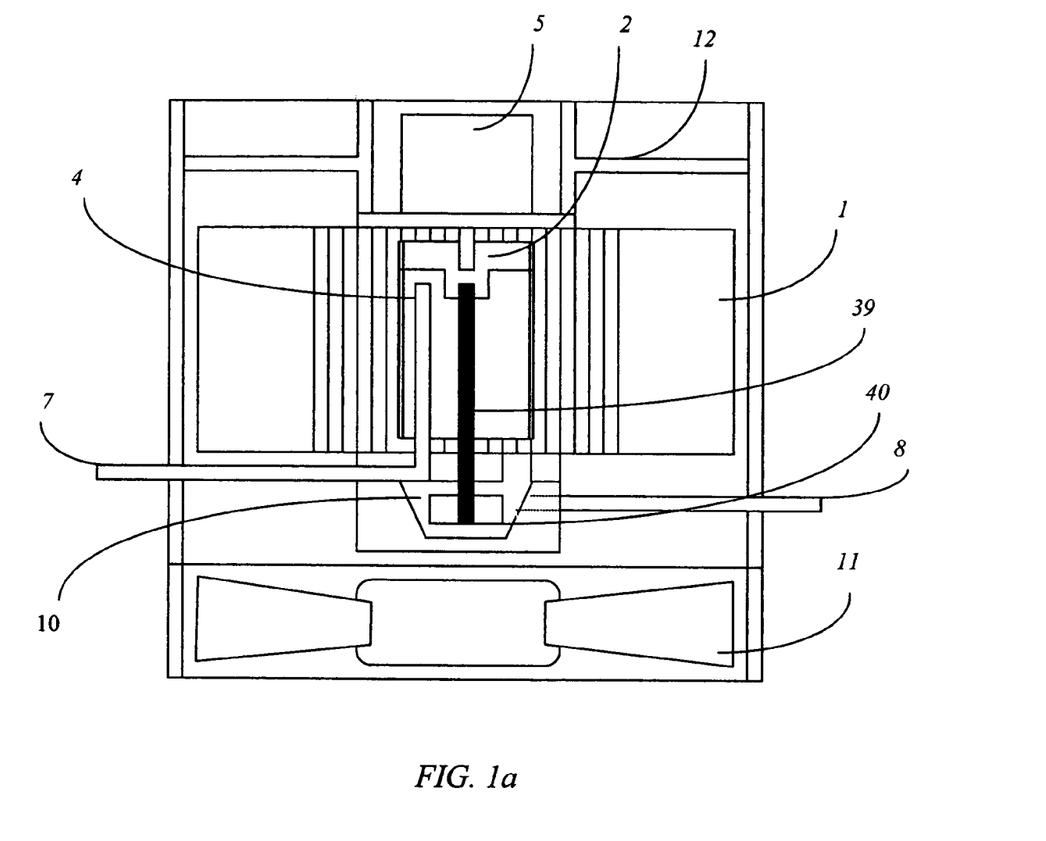
FIG. 1a is a full cross section elevation view of the fluid and air heat exchanger with all the components described in FIG. 1 plus a pumping vane connected to the electric motor and spinning slotted cylinder by an interconnecting rod.
Figure 2:
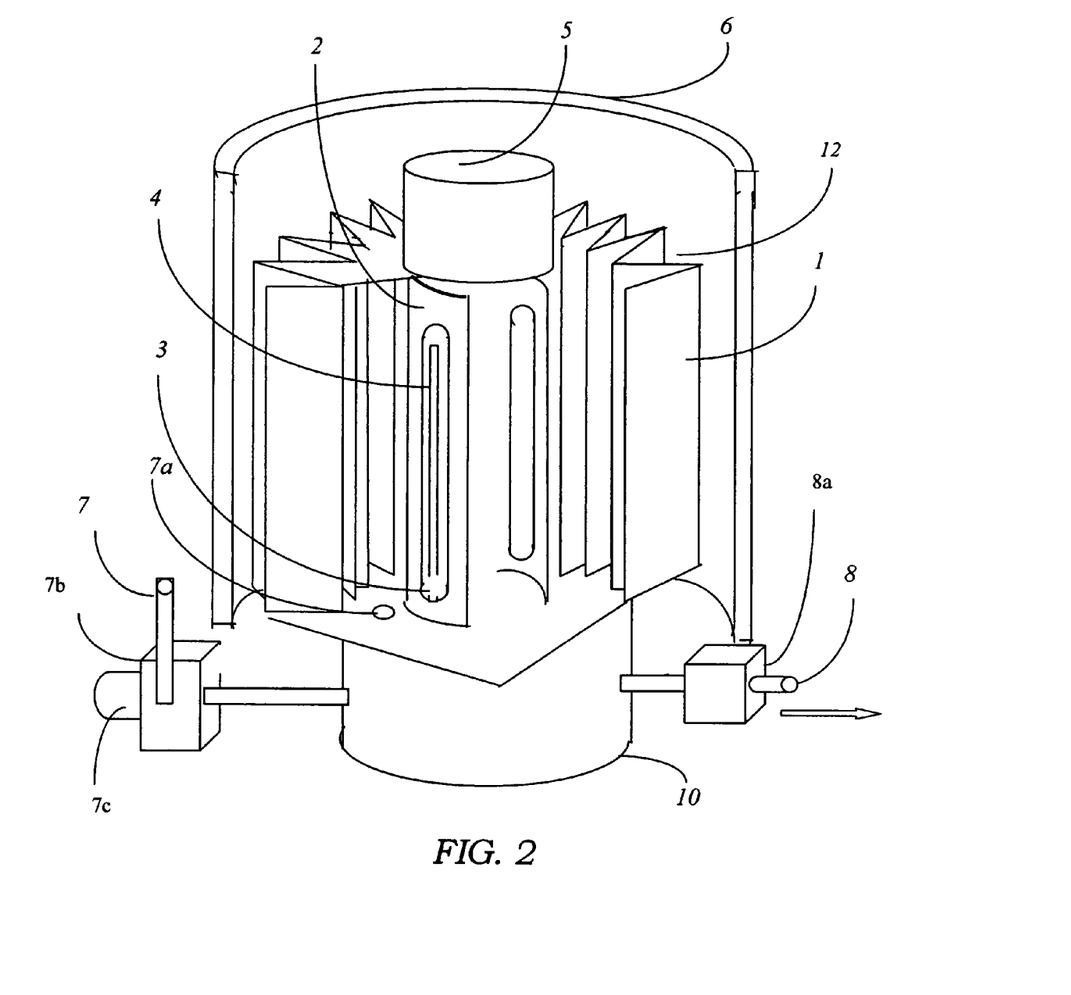
FIG. 2 is a perspective view of the fluid and air heat exchanger with section of heat exchanger housing shell, portion of the closed heat conductive pleated and corrugated chamber, and portion of the spinning slotted cylinder removed exposing the spatial relationship and arrangement of the components.
Figure 3:
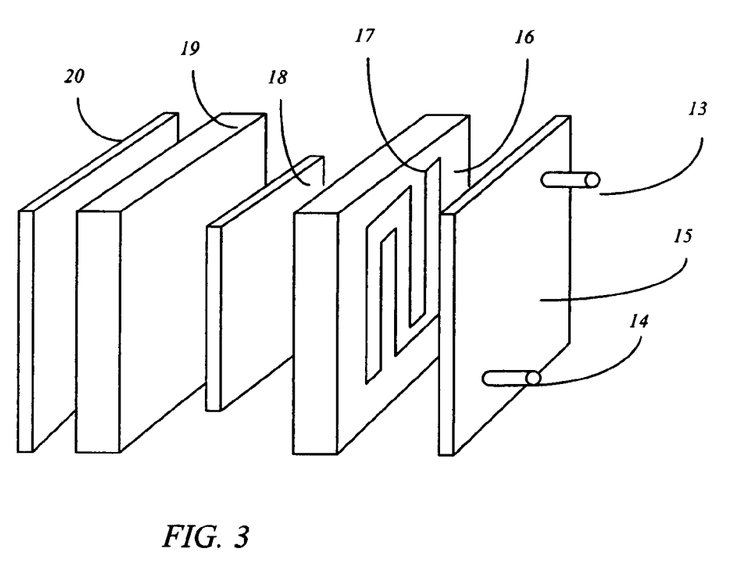
FIG. 3 Is a perspective view of a fluid to fluid heat exchanger utilizing a Peltier device for absorbing or dispensing heat energy to supply pre-chilled or preheated fluid to fluid heat exchanger.
Figure 4:
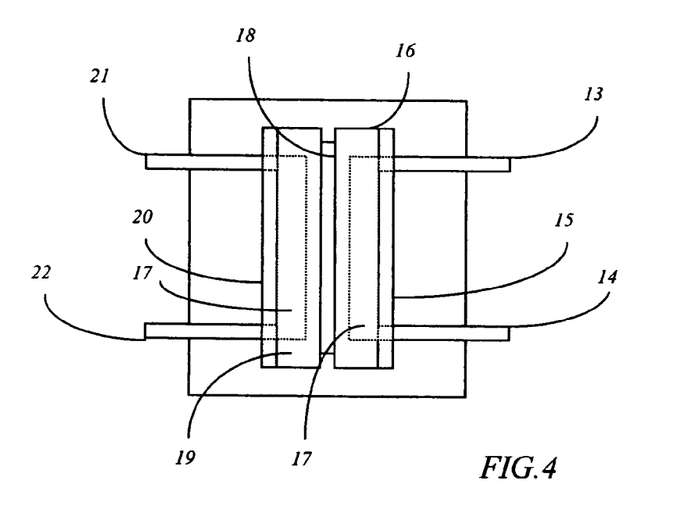
FIG. 4 is a side elevation view showing the manner the Peltier device heat exchanger is assembled for operation.

Referring now to the drawings and with specificity to FIGS. 1, 1*a*, and 2, a fluid and air heat exchange apparatus in accordance with the present invention is shown. An fluid atomizer is comprised of an electric motor 5, with its output shaft connected to cylinder 2, with multiple longitudinal slots 3, covered from inside with fine mesh screen 3*a*, for atomization of fine uniform size fluid droplets. A tube 4, with multiple small perforations on the side of the tube at closest proximity to the inside cylinder wall at various intervals, closed at distal end, and connected to inlet fluid supply tube 7 is mounted off-center inside cylinder 2. Amount of fluid entering the heat exchanger is governed by variable fluid valve 7*b* set by stepping motor 7*c*. Mounting position of tube 4 accounts for two important aspects of fluid delivery. Firstly, fluid streams sprayed from the tube perforations have minimal distance to travel, thus requiring only a low pressure pump supplying the fluid with attending low electrical power consumption. Secondly, the center space within the cylinder is reserved for an interconnecting rod linking the motor to pump vane 40. When small fluid streams from tube 4 strike the screens of rapidly spinning slotted cylinder 2 part of the fluid migrates through the screen openings by centrifugal force. Upon arriving at edges of the screen wires, the fluid is sheared into uniform size droplets and projected outward in tangential and radial manner by centrifugal force from cylinder 2. Fluid striking the closed concave section of the cylinder accumulates until overcome by gravity and moves downward and sideways due to centrifugal action and gravity until reaching the next open slot's wire screen and sheared into droplets at a slightly lower position. These factors enable fluid to be atomized and projected along the entire length of the slots.

The droplet atomization and projection device described above is enclosed within a closed, thin wall, heat conductive, pleated, and corrugated chamber 1. The important objects for the chamber configuration include:

1. providing a surrounded surface for fluid droplets projected from the spinning cylinder to form a continuous fluid film
2. providing a very large surface area for heat exchange between fluid film and ambient air outside the chamber
3. providing a short conductive path for fluid and air heat transfer
4. providing connection to a reservoir where processed fluid is pumped out of the heat exchanger and returned to central reservoir to be re-chilled or reheated again
5. providing a mounting platform for electric motor 5.

Droplets arriving at the inner surface of the closed chamber 1 possess enough kinetic energy to cause the droplets to flatten and spread. The spreading droplets, due to their close proximity to each other, merge to form a continuous fluid film. Newly arriving droplets continuously replenish the film, and excess processed fluid from the film runs downward by the effect of gravity to the bottom of chamber 1 into the connected reservoir 10 to be pumped away from the heat exchanger. Returning fluid is expelled from the heat exchanger by pumping vane 40 into small chamber *8a* containing temperature sensor *8b* measuring temperature of output fluid.

An axial fan 11, located inside the heat exchanger housing 6 mounted either on top or below the heat exchanger assembly, propels or sucks in ambient air through space 12 between chamber 1 and inside the housing 6 wall. Ambient air traversing the length of the chamber wall allows long contact time between air and chamber wall for more efficient fluid and air heat transfer.

Other elements are needed for the active fluid and air heat exchanger to function as an independently functioning device or as a complete system in multiple modules in central air conditioning and heating within a structure or dwelling. These necessary elements are comprised of a refrigeration unit, a heating component, a reservoir in which the fluid is chilled or heated, a pump that delivers the fluid to module(s), and plural tubes for conveying fluid to and from the module (s). These, also, are important elements for the active fluid and air heat exchanger to function as a closed loop fluid flow system.

Figure 5:
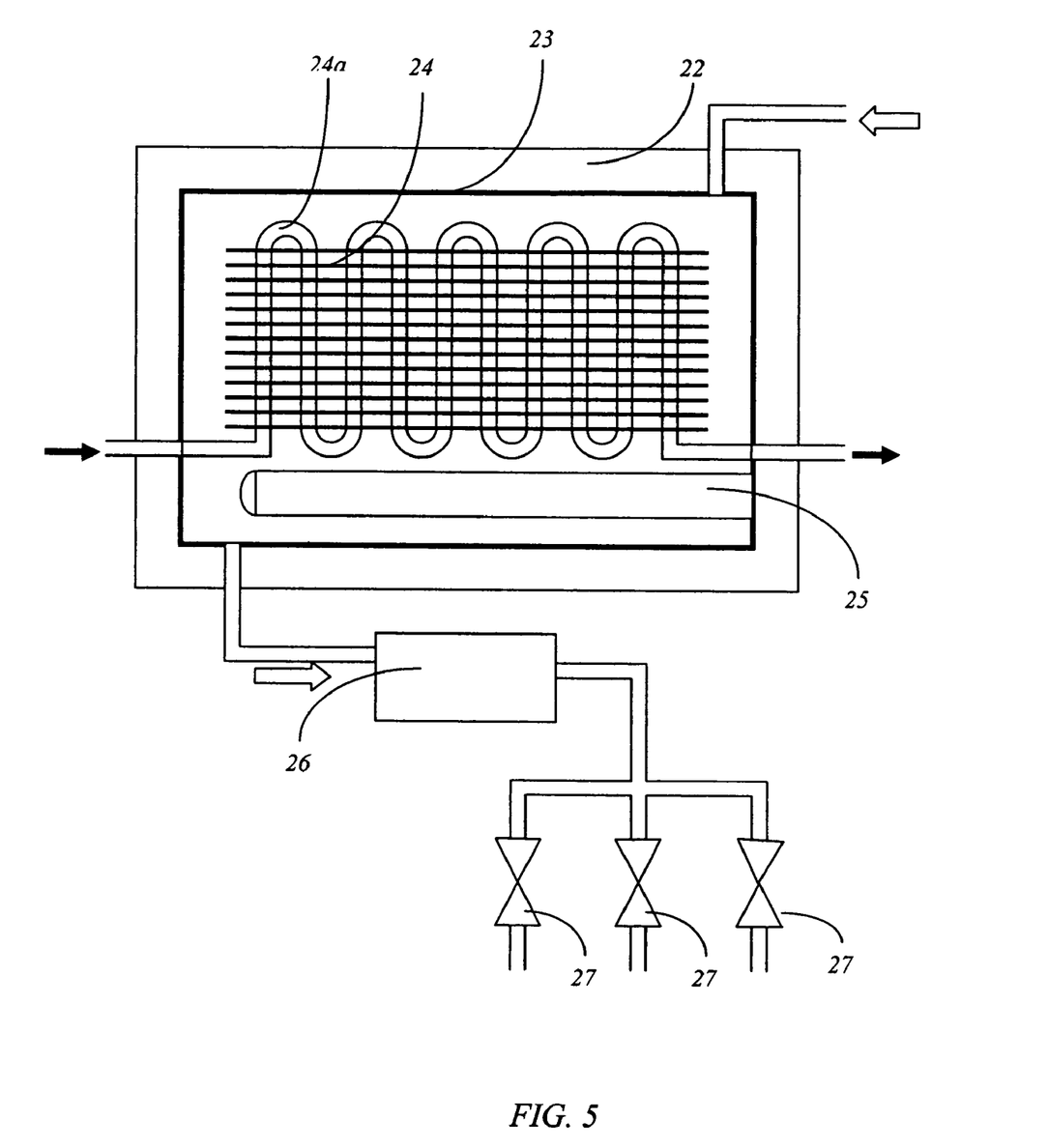
FIG. 5 is a cross sectional elevation view of a fluid reservoir with chilling component (evaporator tube) of a refrigeration unit and heating element, and its relationship to a electric pump for fluid delivery to fluid and air heat exchanger module (s) and manual or electronic valves for regulating flow to each module.
Figure 6:
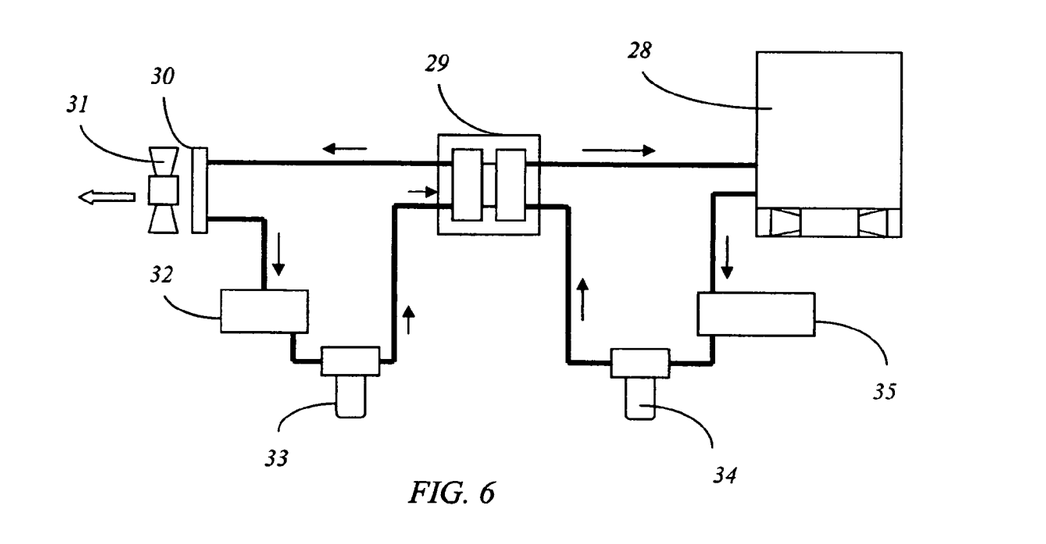
FIG. 6 is a diagrammatic view showing the relation of components and closed loop fluid circulation when the Peltier device fluid to fluid heat exchanger is supplying pre-chilled or preheated fluid to fluid and air heat exchanger module.
Figure 7:
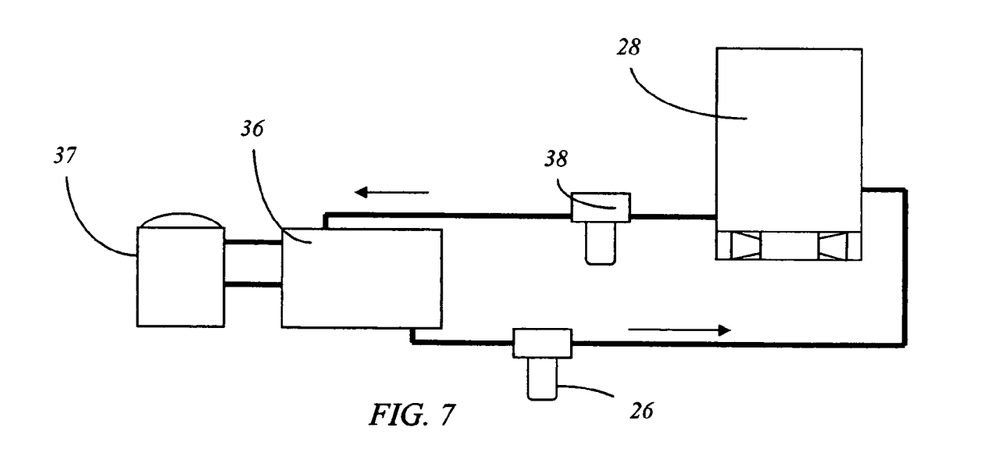
FIG. 7 is a diagrammatic view showing physical relationship and closed loop fluid flow between a chilling and heating fluid reservoir, a refrigeration unit, and associated pumps.
Figure 8:
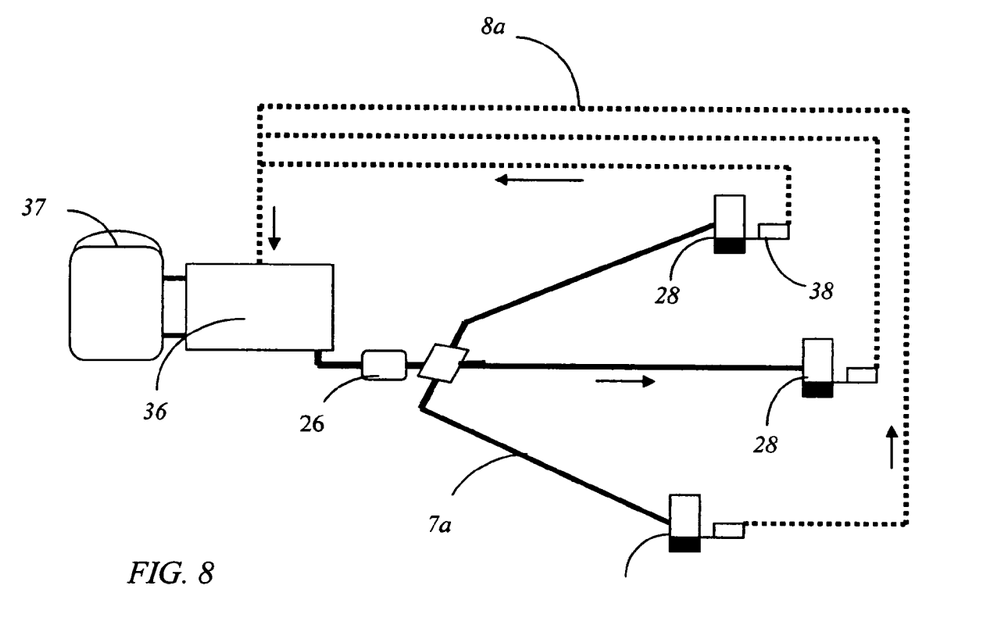
FIG. 8 is a diagrammatic representation of multiple fluid and air heat exchanger modules' physical and functional relationship between a central chilling and heating reservoir and a refrigeration unit.
Figure 9:
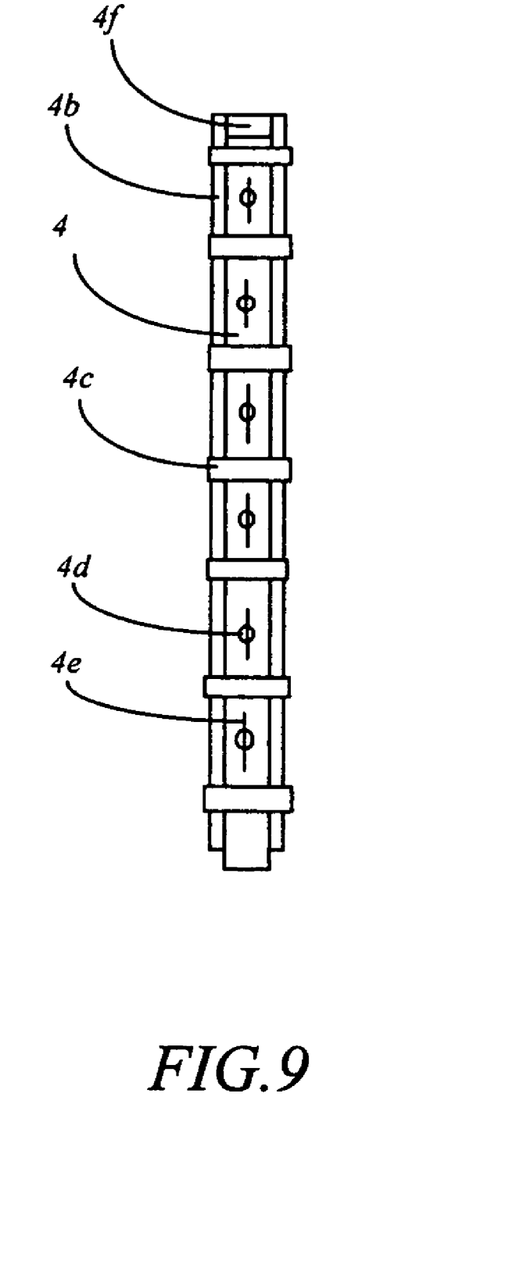
FIG. 9 is a front elevation view of an alternate fluid delivery tube with an elastic tubing cover providing slits over the inner tube perforations.
Figure 10:
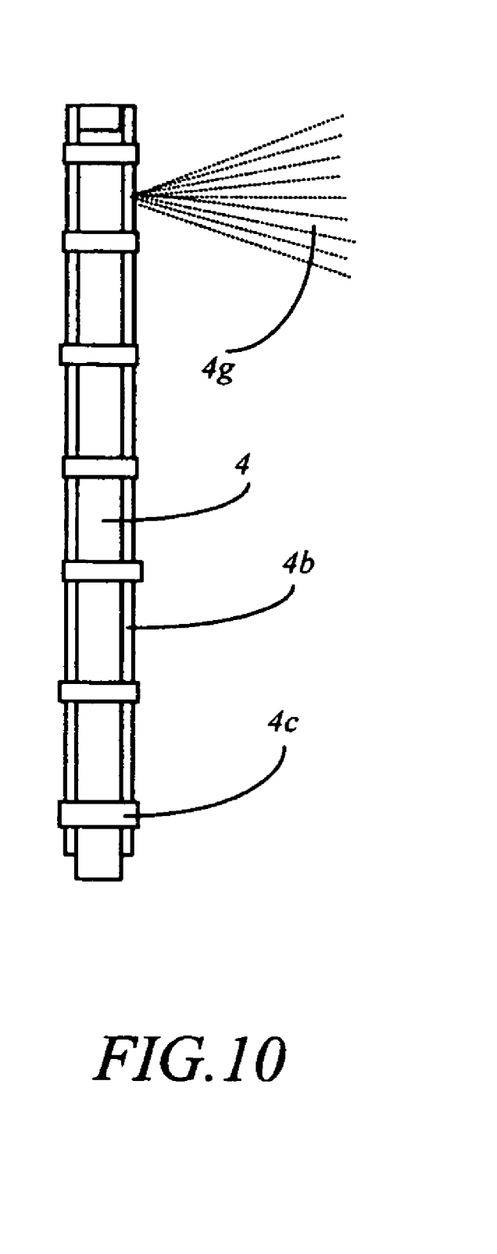
FIG. 10 is a front elevation view of an alternate fluid delivery tube as illustrated in FIG. 9 but oriented by turning 90 degrees showing pattern of fluid spray.

A preferred embodiment of the central reservoir is illustrated in FIG. 5 with inclusion of an evaporator coil fitted with fin 24 from a refrigeration unit and a sealed electric resistive element 25 immersed in reservoir 23 covered with insulation 22. A tube delivers chilled or heated fluid from the reservoir 23 to a pump 26. The pump in turn propels the fluid under low pressure to a single module or to a central dispenser FIG. 8, 26 then conveys the pre-chilled or preheated fluid through insulated small bore tubes to multiple active fluid and air heat exchange modules. The processed fluid with heat gained or heat dispensed from the module(s) is returned by the integrated pumping element of the module(s) to the central reservoir to be chilled or heated again in a closed loop flow system.

Figure 11:
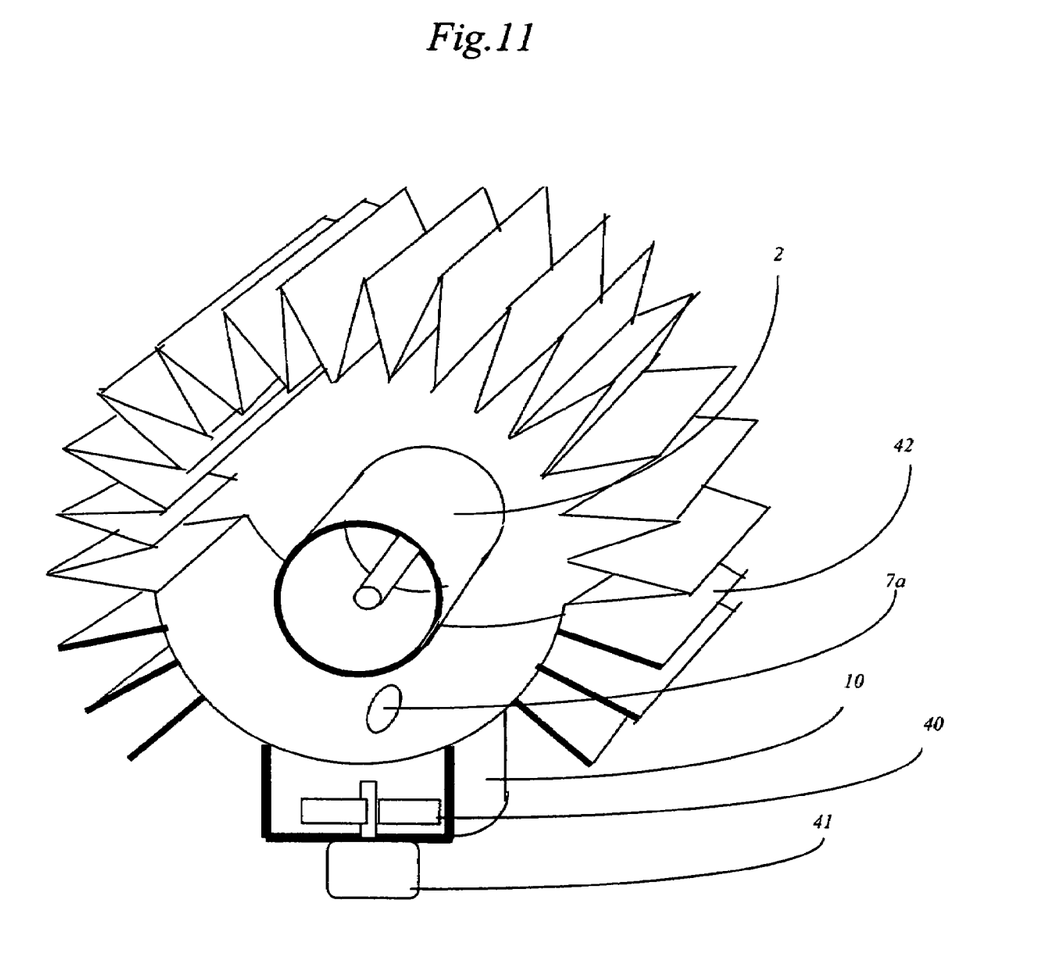
FIG. 11 is a possible arrangement of a horizontal mount heat exchanger in perspective form.

FIG. 7 illustrates the components required for a independently functioning air conditioner and heater. This functioning unit is comprised of a refrigeration unit (compressor and condenser) 37, a central reservoir 36, a pump 26 for propelling chilled or heated fluid to a heat exchanger module 28, and small bore tubes for fluid circulation represented by solid lines. An optional pump 38 for returning fluid to the central reservoir 36 is included in the illustration should the pumping elements not be included with the heat exchanger module.

A complete central air conditioning and heating system is represented in FIG. 8 for a structure or dwelling. This system is comprised of a refrigeration unit (compressor and condenser portion) 37, a central reservoir 36, a pump 26, a central dispenser *26a*, tubes represented by solid lines for delivery of pre-chilled and preheated fluid to multiple modules 28, and tubes for returning processed fluid to central reservoir 36 represented by dotted lines.

Since the fluid flow requirement for each heat exchanger module is so small, less than 200 milliliters per minute as an example, there are various other possibilities for pre-chilling or preheating the fluid. One possibility is utilizing a Peltier device to heat or cool the fluid. This method is illustrated in FIGS. 3, 4, and 6. A separate assembled heat exchanger is represented in FIG. 4 comprising two mirror-imaged heat transfer bodies 16 and 19 with channels, two mirror-imaged heat exchanger covers 15 and 20 fitted with small tubes 13, 14, and 21, 22. The Peltier device 18 is sandwiched between the two heat exchanger bodies 16 and 19. The entire assembly is well insulated. This air conditioning and heating system is suitable for cooling and heating a smaller space such as a refrigerator or the passenger compartment of an automobile with a scaled down fluid and air heat exchanger. A scaled down version of the heat exchanger module with a 10 centimeter (4 inch) diameter closed chamber inside a 15.24 centimeter (6 inch) diameter module housing is suitable for such applications. Required components for this system to operate and fluid flow circuit are illustrated in FIG. 6. They comprise a scaled down fluid and air heat exchanger 28, a small reservoir 35 associated with the fluid and air heat exchanger 28, an assembly of Peltier device heat exchanger 29, a conventional fluid and air heat exchanger 30, a blower 37, and a small reservoir 32 associated with the conventional heat exchanger 30. Arrows in the diagram represent direction of fluid flow. Other possibilities of heating fluid include use of conventional water heating solar panel or parabolic mirror. A more conventional method is to immerse a length of tube from the inlet loop of the central reservoir into a hot water heater of a dwelling, then return and connect the central reservoir.

The fluid and air heat exchanger can be scaled to any size within certain parameters. Diameter of the closed, heat conductive, pleated, corrugated chamber is only limited by the distance droplets can travel determined by the centrifugal force in projection of the droplets. The rotational speed and diameter of the slotted cylinder determine the size of the droplets and distance droplets can be projected by centrifugal force. Optimum droplet size during formation of a continuous fluid film in turn determines the rotational speed and diameter of the slotted cylinder. These factors determine the upper limit on the size of the fluid and air heat exchanger module.

Another aspect regarding the spinning cylinder is that no wire screen is needed to cover the slot openings if the diameter of the spinning slotted cylinder is larger than 5 centimeters and the rotation rate is greater than 3,000 revolutions per minute. The high rotational speed of the cylinder is so great that virtually all the fluid streams projected by the fluid delivery tube is sheared into droplets before the fluid can escape through the open slots.

An alternative construction of the fluid delivery tube is illustrated in FIG. 9 and FIG. 10 for providing a wider spray pattern with more even distribution of droplets impacting the inner surface of the rotating slotted and screened cylinder 2. An elastic tubing *4b*, a silicon rubber tubing for example, is slipped over the perforated fluid delivery tube 4. Fine longitudinal slits *4e* are made at center of each perforation. A ring clamp *4c* is attached to the elastic tubing above, below, and in-between each slit *4e* preventing the slit *4e* to move out of intended position due to fluid pressure. FIG. 10 illustrates a view in which the elastic covered fluid delivery tube assembly as in FIG. 9 is turned 90 degrees to the left showing the spray pattern *4g* obtainable with this construction.

The active fluid and air heat exchanger module thus described has been shown in a vertical arrangement. However it is also possible to modify the heat exchanger module to function in a horizontal position. This modification is illustrated in FIG. 11. The closed, thin wall, heat conductive corrugated, and pleated chamber is modified leaving the lower section without corrugation and pleating to accommodate unobstructed flowing of processed fluid to the reservoir to be pumped away. Fins, exemplified by 42, are attached to the smooth area for compensation of lost heat exchange area due to lack of corrugation and pleating of the chamber wall. The reservoir 10 where the processed fluid is accumulating is located perpendicular to the chamber orientation. An extra motor 41 with a pumping vane 40 attached inside the reservoir 10 is mounted below the reservoir 10.

Figure 12:
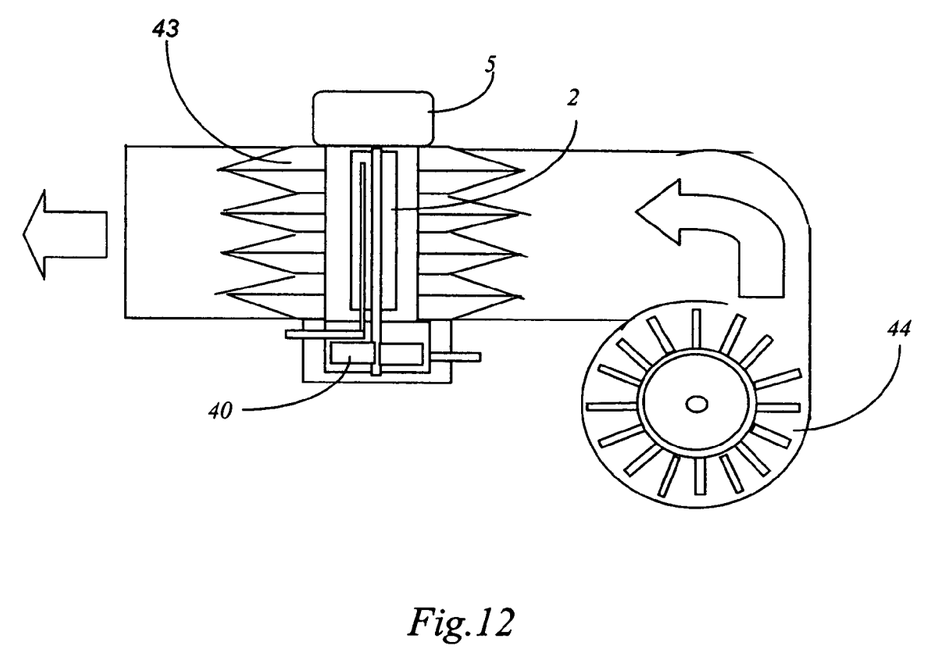
FIG. 12 is an alternative arrangement of a horizontal mount heat exchanger in side elevation with a centrifugal blower.

Another version of the horizontally mounted heat exchanger employs a pleated chamber in the form of an air bellow 43 and a centrifugal blower 44 mounted perpendicularly to the heat exchanger direction. Such an arrangement is suitable for automobile air conditioning and other applications.

Accordingly, the reader will see that the fluid and air heat exchanger and its integration with other elements into an independently functioning unit or a central air conditioning and heating system provide many advantages. These advantages include energy conservation due to high efficiency energy use, low energy consumption, economical initial cost, ease of initial installation or retrofit, and independent rapid temperature adjustment in individual room or space. These benefits are achievable due to the embodiments of the elements and method of this invention such as:

chilling or heating fluid in a central reservoir
  propelling under low pressure chilled or heated fluid in small tubes to individual room or space within a structure or dwelling, thus eliminating inefficient traditional air ducts
  calculating heat transfer rate for any given instant and actively adjusting input fluid amount according to increase or decrease of heat transfer rate
  atomizing fluid into small uniform size droplets by centrifugal force
  projecting droplets by same centrifugal force onto a large surface of thin, heat conductive material forming a fluid film
  conducting heat energy through an exceedingly short path between fluid film and air
  returning processed fluid to be chilled or heated again in a continuous closed loop cycle utilizing only a small amount of fluid.

Although the description above contains many specifications, these should not be construed as limiting the scope of the invention but as merely providing illustrations of some of the presently preferred embodiments of this invention. For example, the closed chamber or the outer shell of the fluid and air heat exchanger module does not have to be circular in shape or size limited to that described. Furthermore, the orientation of the heat exchanger module can be horizontal or tilted at an angle with suitable modification of the chamber shape. Other examples include heating slow moving fluid in a heat transparent tube with parabolic solar mirror or microwave beam or pre-chilling the tube in slow moving cool tap, well, stream, lake, or ocean water prior to being delivered to the central reservoir for final chilling or heating saving additional energy.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for active fluid and air heat exchange for refrigeration, cooling, and heating purposes comprising:
  means for controlling an amount of fluid entering a heat exchanger for processing coupled with integrated temperature sensors;
  a structure configured to produce controlled atomization and projection droplets, said structure including
  a perforated tube means for delivering pre-chilled or pre-heated fluid for atomization,
  a motorized spinning slotted cylinder for atomizing the fluid into droplets and projecting the droplets by centrifugal force,
  a closed, pleated, corrugated, heat conductive chamber for forming a fluid film on an inner wall surface of the chamber, the chamber conducting heat energy from ambient air to the fluid film in cooling and conducting heat energy from the fluid film to ambient air in heating,
  a pumping vane means for returning excess fluid after heat exchange with the fluid film, and
  a motorized fan for conveying ambient air to an outer surface of said closed, pleated, corrugated, heat conductive chamber to be cooled or heated.

2. The apparatus as in claim 1, wherein said perforated tube is closed at one end has a plurality of perforations at various intervals along its length for projecting the pre-chilled or preheated fluid to an inside surface of said motorized spinning slotted cylinder to be atomized.

3. The apparatus as in claim 2, wherein an electric motor is mounted outside at one end of said closed, pleated, corrugated, heat conductive chamber, to rotate said slotted cylinder for atomizing and projecting of fluid droplets by centrifugal force and for driving said pumping vane.

4. The apparatus as in claim 3, wherein said spinning cylinder has a plurality of open slots along its length and is covered with a fine mesh screen and is connected to said electric motor for atomizing and projecting of fluid droplets by centrifugal force.

5. The apparatus as in claim 4, wherein said closed, pleated, corrugated, heat conductive chamber provides a surface area for forming a continuous fluid film from sprayed droplets.

6. The apparatus as in claim 5, wherein said pump vane returns processed excess fluid to be chilled or heated again.

* * * * *